United States Patent [19]

Merchant et al.

[11] Patent Number: 5,250,208

[45] Date of Patent: * Oct. 5, 1993

[54] TERNARY AZEOTROPIC COMPOSITIONS

[75] Inventors: Abid N. Merchant; Janet C. Sung, both of Wilmington, Del.

[73] Assignee: E. I. Du Pont de Nemours and Company, Wilmington, Del.

[*] Notice: The portion of the term of this patent subsequent to Mar. 16, 2010 has been disclaimed.

[21] Appl. No.: 864,817

[22] Filed: Apr. 2, 1992

[51] Int. Cl.$^5$ .................... C09K 5/04; C11D 7/30; C11D 7/50; C23G 5/028
[52] U.S. Cl. ........................... 252/67; 60/651; 62/114; 134/12; 134/31; 134/38; 134/40; 174/17 GF; 174/25 G; 252/8; 252/162; 252/171; 252/172; 252/194; 252/305; 252/364; 252/571; 252/DIG. 9; 264/53; 264/DIG. 5; 521/98; 521/131
[58] Field of Search ............. 252/8, 67, 162, 171, 252/172, 194, 305, 364, 571, DIG. 9; 60/651; 62/114; 134/12, 31, 38, 40, 42; 174/17 GF, 25 G; 264/53, DIG. 5; 521/98, 131

[56] References Cited

U.S. PATENT DOCUMENTS

| | | | |
|---|---|---|---|
| 3,927,129 | 12/1975 | Haszeldine et al. | 260/653.1 R |
| 4,157,979 | 6/1979 | Walters | 252/162 |
| 4,693,799 | 9/1987 | Yanagihara et al. | 204/165 |
| 4,789,690 | 12/1988 | Milovanovic-Lerik | 521/137 |
| 4,910,041 | 3/1990 | Yanagihara et al. | 427/37 |
| 5,059,728 | 10/1991 | Li et al. | 570/134 |
| 5,073,291 | 12/1991 | Robeck et al. | 252/171 |
| 5,116,426 | 5/1992 | Asano et al. | 134/40 |
| 5,118,359 | 6/1992 | Li et al. | 134/42 |
| 5,124,065 | 6/1992 | Magid et al. | 252/171 |
| 5,130,345 | 7/1992 | Li et al. | 521/131 |

FOREIGN PATENT DOCUMENTS

| | | |
|---|---|---|
| 431458 | 6/1991 | European Pat. Off. |
| 61-26832 | 6/1986 | Japan . |
| 2-222494 | 9/1990 | Japan . |
| 90/08814 | 9/1990 | World Int. Prop. O. |

OTHER PUBLICATIONS

Chemical Abstracts, vol. 82, No. 19, Abstract No. 118757y, May, 1975, Abstracts of Burns et al., Anaesthesia, vol. 29(4), 1974, pp. 435-444.

*Primary Examiner*—Linda Skaling
*Attorney, Agent, or Firm*—P. Michael Walker

[57] ABSTRACT

Azeotropic or azeotrope-like compositions of effective amounts of 1,1,2,2,3,3,4,4,-octofluorobutane; trans-1,2-dichloroethylene, cis-1,2-dichloroethylene, 1,1-dichloroethane, or 1,3-dichloro-1,2,2,3,3-HCFC-225cb; and an alcohol such as methanol, ethanol, or isopropanol, to form an azeotropic or azeotrope-like composition are disclosed that are useful as cleaning agents, refrigerants, aerosol propellants, heat transfer media, gaseous dielectrics, fire extinguishing agents, expansion agents for polyolefins and polyurethanes and as power cycle working fluids.

5 Claims, No Drawings

TERNARY AZEOTROPIC COMPOSITIONS

FIELD OF THE INVENTION

This invention relates to compositions, or mixtures, of fluorinated hydrocarbons and more specifically to azeotropic or azeotrope-like compositions comprising effective amounts of 1,1,2,2,3,3,4,4-octafluorobutane; trans-1,2-dichloroethylene, cis-1,2-dichloroethylene, 1,1-dichloroethane, or 1,3-dichloro-1,2,2,3,3-pentafluoropropane; and an alcohol such as methanol, ethanol, or isopropanol, to form an azeotropic or azeotrope-like composition. Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent.

Preferably, cleaning agents should have a low boiling point, nonflammability, low toxicity, and high solvency power so that flux and flux-residues can be removed without damaging the substrate being cleaned. Further, it is desirable that cleaning agents that include a fluorinated hydrocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or could have less-desirable solvency properties, such as lower rosin flux solvency and lower inertness toward the electrical components being cleaned. The azeotropic property is also desirable in vapor degreasing operations because the cleaning agent is generally redistilled and reused for final rinse cleaning.

Fluorinated hydrocarbons may also be used as refrigerants. In refrigeration applications, a refrigerant is often lost during operation through leaks in shaft seals, hose connections, solder joints, and broken lines. In addition, the refrigerant may be released to the atmosphere during maintenance procedures on refrigeration equipment. Accordingly, it is desirable to use a single fluorinated hydrocarbon or an azeotropic or azeotrope-like composition that includes one or more fluorinated hydrocarbons as a refrigerant. Some nonazeotropic compositions that include one or more fluorinated hydrocarbons may also be used as refrigerants, but they have the disadvantage of changing composition, or fractionating, when a portion of the refrigerant charge is leaked or discharged to the atmosphere. If a nonazeotropic composition contains a flammable component, the blend could become flammable because of such a change in composition. Refrigerant equipment operation could also be adversely affected due to the change in composition and vapor pressure that results from fractionation.

Azeotropic or azeotrope-like compositions of fluorinated hydrocarbons are also useful as blowing agents in the manufacture of close-cell polyurethane, phenolic and thermoplastic foams. Insulating foams require blowing agents not only to foam the polymer, but more importantly to utilize the low vapor thermal conductivity of the blowing agents, which is an important characteristic for insulation value.

Aerosol products employ both single component fluorinate hydrocarbons and azeotropic or azeotrope-like compositions of fluorinated hydrocarbons as propellant vapor pressure attenuators in aerosol systems. Azeotropic or azeotrope-like compositions, with their substantially constant compositions and vapor pressures, are useful as solvents and propellants in aerosols.

Azeotropic or azeotrope-like compositions that include fluorinated hydrocarbons are also useful as heat transfer media, gaseous dielectrics, fire extinguishing agents, power cycle working fluids such as for heat pumps, inert media for polymerization reactions, fluids for removing particulates from metal surfaces, and as carrier fluids that may be used, for example, to place a fine film of lubricant on metal parts.

Azeotropic or azeotrope-like compositions that include fluorinated hydrocarbons are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists when used with, for example, a chlorohydrocarbon such as 1,1,1-trichloroethane or trichloroethylene.

Some of the fluorinated hydrocarbons that are currently used in these applications have been theoretically linked to depletion of the earth's ozone layer and to global warming. What is needed, therefore, are substitutes for fluorinated hydrocarbons that have low ozone depletion potentials and low global warming potentials.

SUMMARY OF THE INVENTION

The present invention relates to the discovery of azeotropic or azeotrope-like compositions comprising admixtures of effective amounts of 1,1,2,2,3,3,4,4-octafluorobutane; trans-1,2-dichloroethylene, cis-1,2-dichloroethylene, 1,1-dichloroethane, or 1,3-dichloro-1,2,2,3,3-pentafluoropropane; and an alcohol such as methanol, ethanol, or isopropanol, to form an azeotropic or azeotrope-like composition.

DETAILED DESCRIPTION

The compositions of the instant invention are constant boiling, azeotropic or azeotrope-like compositions, or mixtures, comprising effective amounts of 1,1,2,2,3,3,4,4-octafluorobutane (HFC-338pcc, or $CHF_2CF_2CF_2CHF_2$, boiling point=44° C.); trans-1,2-dichloroethylene (CHCl=CHCl, boiling point=48.0° C.), cis-1,2-dichloroethylene (CHCl=CHCl, boiling point=60.1° C.), 1,1-dichloroethane ($CHCl_2CH_3$, boiling point=57.3° C.), or 1,3-dichloro-1,2,2,3,3-pentafluoropropane (HCFC-225cb, or $CHClFCF_2CClF_2$, boiling point=52° C.); and an alcohol such as methanol ($CH_3OH$, boiling point=64.6° C.), ethanol ($CH_3$—$CH_2$—OH, boiling point=78.4° C.), or isopropanol ((CH₃)₂—CHOH, boiling point=82.3° C.), to form an azeotropic or azeotrope-like composition.

Effective amounts of 1,1,2,2,3,3,4,4-octafluorobutane; trans-1,2-dichloroethylene, cis-1,2-dichloroethylene, 1,1-dichloroethane, or 1,3-dichloro-1,2,2,3,3-pentafluoropropane; and an alcohol such as methanol, ethanol, or isopropanol, to form an azeotropic or azeotrope-like composition, when defined in terms of weight percent of the components at a specific pressure or temperature, include the following.

Substantially constant-boiling, azeotropic or azeotrope-like compositions of HFC-338 pcc, trans-1,2-dichloroethylene and methanol comprise about 56.8 to 69.8 weight percent HFC-338 pcc, about 27.9 to 39.9 weight percent trans-1,2-dichloroethylene, and about 1.8 to 3.8 weight percent methanol. These compositions boil at about 34.7°+/−0.4° C., at substantially atmospheric pressure. A preferred composition comprises about 62.0 to 64.6 weight percent HFC-338 pcc, 32.7 to 35.1 weight percent trans-1,2-dichloroethylene, and about 2.6 to 3.0 weight percent methanol. A more preferred composition is the azeotrope, which comprises about 63.3 weight percent HFC-338 pcc, about 33.9 weight percent trans-1,2-dichloro-ethylene, and about 2.8 weight percent methanol, and which boils at about 34.7° C., at substantially atmospheric pressure.

Substantially constant-boiling, azeotropic or azeotrope-like compositions of HFC-338 pcc, trans-1,2-dichloroethylene and ethanol comprise about 63.2 to 69.2 weight percent HFC-338 pcc, about 30.0 to 36.0 weight percent trans-1,2-dichloroethylene, and about 0.2 to 1.4 weight percent ethanol. These compositions boil at about 36.1°+/−0.3° C., at substantially atmospheric pressure. A preferred composition comprises about 65.9 to 66.5 weight percent HFC-338 pcc, 32.8 to 33.2 weight percent trans-1,2-dichloroethylene, and about 0.6 to 1.0 weight percent ethanol. A more preferred composition is the azeotrope, which comprises about 66.2 weight percent HFC-338 pcc, about 33.1 weight percent trans-1,2-dichloroethylene, and about 0.7 weight percent ethanol, and which boils at about 36.1° C., at substantially atmospheric pressure.

Substantially constant-boiling, azeotropic or azeotrope-like compositions of HFC-338 pcc, trans-1,2-dichloroethylene and isopropanol comprise about 60.0 to 68.0 weight percent HFC-338 pcc, about 31.7 to 39.7 weight percent trans-1,2-dichloroethylene, and about 0.1 to 0.5 weight percent isopropanol. These compositions boil at about 36.0°+/−0.3° C., at substantially atmospheric pressure. A preferred composition comprises about 63.9 to 64.1 weight percent HFC-338 pcc, 35.5 to 35.9 weight percent trans-1,2-dichloroethylene, and about 0.2 to 0.4 weight percent isopropanol. A more preferred composition is the azeotrope, which comprises about 64.0 weight percent HFC-338 pcc, about 35.7 weight percent trans-1,2-dichloroethylene, and about 0.3 weight percent isopropanol, and which boils at about 36.0° C., at substantially atmospheric pressure.

Substantially constant-boiling, azeotropic or azeotrope-like compositions of HFC-338 pcc, cis-1,2-dichloroethylene and methanol comprise about 78.2 to 84.2 weight percent HFC-338 pcc, about 12.3 to 18.3 weight percent cis-1,2-dichloroethylene, and about 2.5 to 4.5 weight percent methanol. These compositions boil at about 40.2°+/−0.3° C., at substantially atmospheric pressure. A preferred composition comprises about 80.9 to 81.5 weight percent HFC-338pcc, 15.0 to 15.6 weight percent cis-1,2-dichloroethylene, and about 3.4 to 3.6 weight percent methanol. A more preferred composition is the azeotrope, which comprises about 81.2 weight percent HFC-338pcc, about 15.3 weight percent cis-1,2-dichloroethylene, and about 3.5 weight percent methanol, and which boils at about 40.2° C., at substantially atmospheric pressure.

Substantially constant-boiling, azeotropic or azeotrope-like compositions of HFC-338pcc, cis-1,2-dichloroethylene and ethanol comprise about 72.4 to 85.4 weight percent HFC-338pcc, about 12.7 to 26.7 weight percent cis-1,2-dichloroethylene, and about 0.4 to 2.4 weight percent ethanol. These compositions boil at about 42.5°+/−0.3° C., at substantially atmospheric pressure. A preferred composition comprises about 77.6 to 80.2 weight percent HFC-338pcc, 18.3 to 21.1 weight percent cis-1,2-dichloroethylene, and about 1.2 to 1.6 weight percent ethanol. A more preferred composition is the azeotrope, which comprises about 78.9 weight percent HFC-338pcc, about 19.7 weight percent cis-1,2-dichloroethylene, and about 1.4 weight percent ethanol, and which boils at about 42.5° C., at substantially atmospheric pressure.

Substantially constant-boiling, azeotropic or azeotrope-like compositions of HFC-338pcc, cis-1,2-dichloroethylene and isopropanol comprise about 75.0 to 86.0 weight percent HFC-338pcc, about 12.5 to 23.5 weight percent cis-1,2-dichloroethylene, and about 0.1 to 1.0 weight percent isopropanol. These compositions boil at about 42.2°+/−0.2° C., at substantially atmospheric pressure. A preferred composition comprises about 75.0 to 86.0 weight percent HFC-338pcc, 12.5 to 23.5 weight percent cis-1,2-dichloroethylene, and about 0.1 to 1.0 weight percent isopropanol. A more preferred composition is the azeotrope, which comprises about 79.0 to 83.0 weight percent HFC-338pcc, about 17.5 to 19.5 weight percent cis-1,2-dichloroethylene, and about 0.2 to 0.4 weight percent isopropanol, and which boils at about 42.2° C., at substantially atmospheric pressure.

Substantially constant-boiling, azeotropic or azeotrope-like compositions of HFC-338pcc, 1,1-dichloroethane and methanol comprise about 76.6 to 84.6 weight percent HFC-338pcc, about 14.0 to 18.0 weight percent 1,1-dichloroethane, and about 1.4 to 5.4 weight percent methanol. These compositions boil at about 40.3°+/−0.5° C., at substantially atmospheric pressure. A preferred composition comprises about 80.2 to 81.0 weight percent HFC-338pcc, 15.8 to 16.2 weight percent 1,1-dichloroethane, and about 3.2 to 3.6 weight percent methanol. A more preferred composition is the azeotrope, which comprises about 80.6 weight percent HFC-338pcc, about 16.0 weight percent 1,1-dichloroethane, and about 3.4 weight percent methanol, and which boils at about 40.3° C., at substantially atmospheric pressure.

Substantially constant-boiling, azeotropic or azeotrope-like compositions of HFC-338pcc, 1,1-dichloroethane and ethanol comprise about 73.5 to 82.5 weight percent HFC-338pcc, about 17.1 to 24.1 weight percent 1,1-dichloroethane, and about 0.4 to 2.4 weight percent ethanol. These compositions boil at about 39.6°+/−0.5° C., at substantially atmospheric pressure. A preferred composition comprises about 77.1 to 78.9 weight percent HFC-338pcc, 19.9 to 21.3 weight percent 1,1-dichloroethane, and about 1.32 to 1.6 weight percent ethanol. A more preferred composition is the azeotrope, which comprises about 78.0 weight percent HFC-338pcc, about 20.6 weight percent 1,1-dichloroethane, and about 1.4 weight percent ethanol, and which boils at about 39.6° C., at substantially atmospheric pressure.

Substantially constant-boiling, azeotropic or azeotrope-like compositions of HFC-338pcc, 1,1-dichloroethane and isopropanol comprise about 77.0 to 87.0 weight percent HFC-338pcc, about 12.6 to 22.6 weight percent 1,1-dichloroethane, and about 0.1 to 1.0 weight percent isopropanol. These compositions boil at about 42.6°+/−0.5° C., at substantially atmospheric pressure. A preferred composition comprises about 81.9 to 82.1 weight percent HFC-338pcc, 17.5 to 17.7 weight percent 1,1-dichloroethane, and about 0.2 to 0.6 weight percent isopropanol. A more preferred composition is the azeotrope, which comprises about 82.0 weight percent HFC-338pcc, about 17.6 weight percent 1,1-dichloroethane, and about 0.4 weight percent isopropanol, and which boils at about 42.6° C., at substantially atmospheric pressure.

Substantially constant-boiling, azeotropic or azeotrope-like compositions of HFC-338pcc, HCFC-225cb and methanol comprise about 71.3 to 91.3 weight percent HFC-338pcc, about 10.2 to 19.8 weight percent HCFC-225cb, and about 2.7 to 4.7 weight percent methanol. These compositions boil at about 42.0°+/−0.3° C., at substantially atmospheric pressure. A preferred composition comprises about 76.3 to 86.3 weight percent HFC-338pcc, 10.2 to 19.8 weight percent HCFC-225cb, and about 3.2 to 4.2 weight percent methanol. A more preferred composition is the azeotrope, which comprises about 81.3 weight percent HFC-338pcc, about 15.0 weight percent HCFC-225cb, and about 3.7 weight percent methanol, and which boils at about 42.0° C., at substantially atmospheric pressure.

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at pressures other than the pressure described herein.

By "azeotropic or azeotrope-like" composition is meant a constant boiling, or substantially constant boiling, liquid admixture of two or more substances that behaves as a single substance. One way to characterize an azeotropic or azeotrope-like composition is that the vapor produced by partial evaporation or distillation of the liquid has substantially the same composition as the liquid from which it was evaporated or distilled, that is, the admixture distills/refluxes without substantial composition change. Constant boiling or substantially constant boiling compositions, which are characterized as azeotropic or azeotrope-like, exhibit either a maximum or minimum boiling point, as compared with that of the nonazeotropic mixtures of the same components.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, and azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The following ternary compositions are characterized as azeotropic or azeotrope-like in that mixtures within this range exhibit a substantially constant boiling point at substantially atmospheric pressure. Being substantially constant boiling, the mixtures do not tend to fractionate to any great extent upon evaporation. After evaporation, only a small difference exists between the composition of the vapor and the composition of the initial liquid phase. This difference is such that the compositions of the vapor and liquid phases are considered substantially identical. Accordingly, any compositions within this range exhibit properties which are characteristic of a true ternary azeotrope.

1. About 56.8 to 69.8 weight percent HFC-338pcc, about 27.9 to 39.9 weight percent trans-1,2-dichloroethylene, and about 1.8 to 3.8 weight percent methanol;

2. About 63.2 to 69.2 weight percent HFC-338pcc, about 30.0 to 36.0 weight percent trans-1,2-dichloroethylene, and about 0.2 to 1.4 weight percent ethanol;
3. About 60.0 to 68.0 weight percent HFC-338pcc, about 31.7 to 39.7 weight percent trans-1,2-dichloroethylene, and about 0.1 to 0.5 weight percent isopropanol;
4. About 78.2 to 84.2 weight percent HFC-338pcc, about 12.3 to 18.3 weight percent cis-1,2-dichloroethylene, and about 2.5 to 4.5 weight percent methanol;
5. About 72.4 to 85.4 weight percent HFC-338pcc, about 12.7 to 26.7 weight percent cis-1,2-dichloroethylene, and about 0.4 to 2.4 weight percent ethanol;
6. About 75.0 to 86.0 weight percent HFC-338pcc, about 12.5 to 23.5 weight percent cis-1,2-dichloroethylene, and about 0.1 to 1.0 weight percent isopropanol;
7. About 76.6 to 84.6 weight percent HFC-338pcc, about 14.0 to 18.0 weight percent 1,1-dichloroethane, and about 1.4 to 5.4 weight percent methanol;
8. About 73.5 to 82.5 weight percent HFC-338pcc, about 17.1 to 24.1 weight percent 1,1-dichloroethane, and about 0.4 to 2.4 weight percent ethanol;
9. About 77.0 to 87.0 weight percent HFC-338pcc, about 12.6 to 22.6 weight percent 1,1-dichloroethane, and about 0.1 to 1.0 weight percent isopropanol; and
10. About 71.3 to 91.3 weight percent HFC-338pcc, about 10.2 to 19.8 weight percent HCFC-225cb, and about 2.7 to 4.7 weight percent methanol.

The following ternary compositions have been established, within the accuracy of the fractional distillation method, as true ternary azeotropes at substantially atmospheric pressure.

1. About 63.3 weight percent HFC-338pcc, about 33.9 weight percent trans-1,2-dichloroethylene, and about 2.8 weight percent methanol;
2. About 66.2 weight percent HFC-338pcc, about 33.1 weight percent trans-1,2-dichloroethylene, and about 0.7 weight percent ethanol;
3. About 64.0 weight percent HFC-338pcc, about 35.7 weight percent trans-1,2-dichloroethylene, and about 0.3 weight percent isopropanol;
4. About 81.2 weight percent HFC-338pcc, about 15.3 weight percent cis-1,2-dichloroethylene, and about 3.5 weight percent methanol;
5. About 78.9 weight percent HFC-338pcc, about 19.7 weight percent cis-1,2-dichloroethylene, and about 1.4 weight percent ethanol;
6. About weight percent HFC-338pcc, about weight percent cis-1,2-dichloroethylene, and about weight percent isopropanol;
7. About 80.6 weight percent HFC-338pcc, about 16.0 weight percent 1,1-dichloroethane, and about 3.4 weight percent methanol;
8. About 78.0 weight percent HFC-338pcc, about 20.6 weight percent 1,1-dichloroethane, and about 1.4 weight percent ethanol;
9. About 82.0 weight percent HFC-338pcc, about 17.6 weight percent 1,1-dichloroethane, and about 0.4 weight percent isopropanol; and
10. About 81.3 weight percent HFC-338pcc, about 15.0 weight percent HCFC-225cb, and about 3.7 weight percent methanol.

The aforestated azeotropes have low ozone-depletion potentials and are expected to decompose almost completely, prior to reaching the stratosphere.

The azeotropic or azeotrope-like compositions of the instant invention permit easy recovery and reuse of the solvent from vapor defluxing and degreasing operations because of their azeotropic natures. As an example, the azeotropic mixtures of this invention can be used in cleaning processes such as described in U.S. Pat. No. 3,881,949, or as a buffing abrasive detergent.

In addition, the mixtures are useful as resist developers, where chlorine-type developers would be used, and as resist stripping agents with the addition of appropriate halocarbons.

Another aspect of the invention is a refrigeration method which comprises condensing a refrigerant composition of the invention and thereafter evaporating it in the vicinity of a body to be cooled. Similarly, still another aspect of the invention is a method for heating which comprises condensing the invention refrigerant in the vicinity of a body to be headed and thereafter evaporating the refrigerant.

A further aspect of the invention includes aerosol compositions comprising an active agent and a propellant, wherein the propellant is an azeotropic mixture of the invention; and the production of these compositions by combining said ingredients. The invention further comprises cleaning solvent compositions comprising the azeotropic mixtures of the invention.

The azeotropic or azeotrope-like compositions of the instant invention can be prepared by any convenient method including mixing or combining the desired component amounts. A preferred method is to weigh the desired component amounts and thereafter combine them in an appropriate container.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

EXAMPLE 1

A solution containing 67.0 weight percent HFC-338pcc, 31.0 weight percent trans-1,2-dichloroethylene and 2.0 weight percent methanol was prepared in a suitable container and mixed thoroughly.

The solution was distilled in a twenty-five plate Oldershaw distillation column using a 15:1 reflux to take-off ratio. Head and pot temperatures were read directly to 0.1° C. The pressure was at 772.5 mmHg. Distillate compositions were determined by gas chromatography. Results obtained are summarized in Table 1.

TABLE 1

| CUTS | TEMPERATURE °C. POT | TEMPERATURE °C. HEAD | WT. % DISTILLED OR RECOVERED | WEIGHT PERCENTAGES HFC-338pcc | WEIGHT PERCENTAGES TRANS | WEIGHT PERCENTAGES MEOH |
| --- | --- | --- | --- | --- | --- | --- |
| 1 | 35.1 | 34.5 | 12.3 | 63.7 | 33.6 | 2.7 |
| 2 | 35.4 | 34.7 | 20.4 | 63.3 | 34.0 | 2.8 |
| 3 | 35.5 | 34.7 | 29.2 | 62.7 | 34.5 | 2.8 |
| 4 | 35.8 | 34.7 | 38.0 | 63.6 | 33.7 | 2.8 |
| 5 | 36.2 | 34.7 | 45.7 | 63.4 | 33.9 | 2.7 |
| 6 | 36.3 | 34.8 | 60.7 | 65.2 | 34.0 | 0.9 |
| 7 | 36.4 | 36.1 | 63.0 | 66.6 | 33.3 | 0.1 |
| HEEL | — | — | 89.6 | 62.1 | 37.9 | 0.0 |

Analysis of the above data indicates very small differences between head temperatures and distillate compositions as the distillation progressed. A statistical analysis of the data indicates that the true ternary azeotrope of HFC-338pcc, trans-1,2-dichloroethylene and methanol has the following characteristics at atmospheric pressure (99 percent confidence limits):

| | |
| --- | --- |
| HFC-338pcc = | 63.3 +/− 1.3 wt. % |
| trans-1,2-dichloroethylene = | 33.9 +/− 1.2 wt. % |
| methanol = | 2.8 +/− 0.2 wt. % |
| Boiling point, °C. = | 34.7 +/− 0.4 |

EXAMPLE 2

Several single sided circuit boards were coated with activated rosin flux and soldered by passing the boards over a preheater to obtain top side board temperatures of approximately 200° F., and then through 500° F. molten solder. The soldered boards were defluxed separately with the azeotropic mixtures cited in Example 1 above by suspending a circuit board for three minutes in a boiling sump that contained the azeotropic mixture, then suspending the board for one minute in a rinse sump that contained the same azeotropic mixture, and then suspending the board for one minute in the solvent vapor above the boiling sump. The boards cleaned in each azeotropic mixture had no visible residue remaining thereon.

EXAMPLE 3

A solution containing 64.1 weight percent HFC-338pcc, 33.4 weight percent trans-1,2-dichloroethylene and 3.0 weight percent ethanol was prepared in a suitable container and mixed thoroughly.

The solution was distilled in a five plate Oldershaw distillation column using a 5:1 reflux to take-off ratio. Head and pot temperatures were read directly to 0.1° C. The pressure was at 772.1 mmHg. Distillate compositions were determined by gas chromatography. Results obtained are summarized in Table 2.

TABLE 2

| CUTS | TEMPERATURE °C. POT | TEMPERATURE °C. HEAD | WT. % DISTILLED OR RECOVERED | WEIGHT PERCENTAGES HFC-338pcc | WEIGHT PERCENTAGES TRANS | WEIGHT PERCENTAGES ETOH |
| --- | --- | --- | --- | --- | --- | --- |
| 1 | 37.2 | 36.1 | 16.3 | 66.3 | 33.1 | 0.6 |
| 2 | 36.8 | 36.1 | 26.0 | 66.3 | 33.1 | 0.7 |
| 3 | 37.0 | 36.1 | 35.2 | 66.3 | 33.1 | 0.7 |
| 4 | 37.1 | 36.1 | 44.6 | 66.3 | 33.1 | 0.7 |
| 5 | 37.3 | 36.1 | 54.4 | 66.2 | 33.1 | 0.7 |
| 6 | 37.7 | 36.1 | 65.9 | 66.2 | 33.1 | 0.8 |
| 7 | 45.2 | 36.1 | 78.6 | 66.1 | 33.2 | 0.8 |
| HEEL | — | — | 90.2 | 55.7 | 36.3 | 8.1 |

Analysis of the above data indicates very small differences between head temperatures and distillate compositions as the distillation progressed. A statistical analysis of the data indicates that the true ternary azeotrope of HFC-338pcc, trans-1,2-dichloroethylene and ethanol has the following characteristics at atmospheric pressure (99 percent confidence limits):

| | |
| --- | --- |
| HFC-338pcc = | 66.2 +/− 0.3 wt. % |
| trans-1,2-dichloroethylene = | 33.1 +/− 0.1 wt. % |
| ethanol = | 0.7 +/− 0.2 wt. % |
| Boiling point, °C. = | 36.1 +/− 0.1 |

EXAMPLE 4

A solution containing 66.2 weight percent HFC-338ppc, 32.0 weight percent trans-1,2-dichloroethylene and 2.0 weight percent isopropanol was prepared in a suitable container and mixed thoroughly.

The solution was distilled in a five plate Oldershaw distillation column using a 5:1 reflux to take-off ratio. Head and pot temperatures were read directly to 0.1° C. The pressure was at 767.8 mmHg. Distillate compositions were determined by gas chromatography. Results obtained are summarized in Table 3.

TABLE 3

| CUTS | TEMPERATURE °C. POT | TEMPERATURE °C. HEAD | WT. % DISTILLED OR RECOVERED | WEIGHT PERCENTAGES HFC-338pcc | WEIGHT PERCENTAGES TRANS | WEIGHT PERCENTAGES IPA |
| --- | --- | --- | --- | --- | --- | --- |
| 1 | 36.5 | 36.0 | 16.3 | 64.2 | 35.7 | 0.1 |
| 2 | 36.8 | 36.0 | 26.0 | 64.1 | 35.7 | 0.2 |

TABLE 3-continued

| CUTS | TEMPERATURE °C. POT | HEAD | WT. % DISTILLED OR RECOVERED | WEIGHT PERCENTAGES HFC-338pcc | TRANS | IPA |
| --- | --- | --- | --- | --- | --- | --- |
| 3 | 37.0 | 36.0 | 35.2 | 64.1 | 35.7 | 0.2 |
| 4 | 37.0 | 36.0 | 44.6 | 64.1 | 35.7 | 0.3 |
| 5 | 37.8 | 36.0 | 54.4 | 64.1 | 35.6 | 0.3 |
| 6 | 40.0 | 36.1 | 65.9 | 64.0 | 35.6 | 0.5 |
| 7 | 58.9 | 36.6 | 78.6 | 64.0 | 35.3 | 0.8 |
| HEEL | — | — | 90.2 | 49.6 | 22.5 | 27.9 |

Analysis of the above data indicates very small differences between head temperatures and distillate compositions as the distillation progressed. A statistical analysis of the data indicates that the true ternary azeotrope of HFC-338ppc, trans-1,2-dichloroethylene and isopropanol has the following characteristics at atmospheric pressure (99 percent confidence limits):

| | |
| --- | --- |
| HFC-338pcc = | 64.0 +/− 0.0 wt. % |
| trans-1,2-dichloroethylene = | 35.7 +/− 0.2 wt. % |
| isopropanol = | 0.3 +/− 0.2 wt. % |
| Boiling point, °C. = | 36.0 +/− 0.1 |

EXAMPLE 5

A solution containing 78.6 weight percent HFC-338pcc, 18.3 weight percent cis-1,2-dichloroethylene and 3.1 weight percent methanol was prepared in a suitable container and mixed thoroughly.

The solution was distilled in a twenty-five plate Oldershaw distillation column using a 15:1 reflux to take-off ratio. Head and pot temperatures were read directly to 0.1° C. The pressure was at 768.2 mmHg. Distillate compositions were determined by gas chromatography. Results obtained are summarized in Table 4.

TABLE 4

| CUTS | TEMPERATURE °C. POT | HEAD | WT. % DISTILLED OR RECOVERED | WEIGHT PERCENTAGES HFC-338pcc | CIS | MEOH |
| --- | --- | --- | --- | --- | --- | --- |
| 1 | 41.5 | 40.1 | 10.8 | 80.7 | 15.9 | 3.4 |
| 2 | 41.5 | 40.2 | 23.9 | 81.1 | 15.4 | 3.5 |
| 3 | 41.6 | 40.2 | 31.9 | 81.3 | 15.2 | 3.5 |
| 4 | 42.3 | 40.2 | 44.9 | 81.3 | 15.2 | 3.5 |
| 5 | 44.3 | 40.2 | 54.8 | 81.2 | 15.3 | 3.5 |
| 6 | 54.0 | 40.2 | 67.8 | 81.2 | 15.3 | 3.5 |
| 7 | 100.0 | 40.2 | 72.8 | 81.3 | 15.2 | 3.5 |
| HEEL | — | — | 92.8 | 76.8 | 23.2 | 0.0 |

Analysis of the above data indicates very small differences between head temperatures and distillate compositions as the distillation progressed. A statistical analysis of the data indicates that the true ternary azeotrope of HFC-338pcc, cis-1,2-dichloroethylene and methanol has the following characteristics at atmospheric pressure (99 percent confidence limits):

| | |
| --- | --- |
| HFC-338pcc = | 81.2 +/− 0.3 wt. % |
| cis-1,2-dichloroethylene = | 15.3 +/− 0.3 wt. % |
| methanol = | 3.5 +/− 0.1 wt. % |
| Boiling point, °C. = | 40.2 +/− 0.1 |

EXAMPLE 6

A solution containing 76.1 weight percent HFC-338pcc, 21.6 weight percent cis-1,2-dichloroethylene and 2.3 weight percent ethanol was prepared in a suitable container and mixed thoroughly.

The solution was distilled in a five plate Oldershaw distillation column using a 5:1 reflux to take-off ratio. Head and pot temperatures were read directly to 0.1° C. The pressure was at 773.8 mmHg. Distillate compositions were determined by gas chromatography. Results obtained are summarized in Table 5.

TABLE 5

| CUTS | TEMPERATURE °C. POT | HEAD | WT. % DISTILLED OR RECOVERED | WEIGHT PERCENTAGES HFC-338pcc | CIS | ETOH |
| --- | --- | --- | --- | --- | --- | --- |
| 1 | 43.2 | 42.3 | 12.2 | 78.1 | 20.6 | 1.3 |
| 2 | 43.2 | 42.4 | 24.2 | 78.9 | 19.8 | 1.3 |
| 3 | 43.5 | 42.5 | 47.4 | 79.2 | 19.5 | 1.4 |
| 4 | 43.8 | 42.5 | 56.9 | 79.1 | 19.4 | 1.4 |
| 5 | 44.4 | 42.6 | 67.7 | 79.1 | 19.5 | 1.4 |
| 6 | 46.3 | 42.6 | 76.4 | 79.0 | 19.6 | 1.4 |
| 7 | 79.4 | 52.5 | 89.6 | 76.8 | 21.1 | 2.1 |
| HEEL | — | — | 93.5 | 50.0 | 37.1 | 13.0 |

Analysis of the above data indicates very small differences between head temperatures and distillate compositions as the distillation progressed. A statistical analysis of the data indicates that the true ternary azeotrope of HFO-338pcc, cis-1,2-dichloroethylene and ethanol has the following characteristics at atmospheric pressure (99 percent confidence limits):

| | |
|---|---|
| HFC-338pcc = | 78.9 +/− 1.3 wt. % |
| cis-1,2-dichloroethylene = | 19.7 +/− 1.4 wt. % |
| ethanol = | 1.4 +/− 0.2 wt. % |
| Boiling point, °C. = | 42.5 +/− 0.3 |

EXAMPLE 7

A solution containing 75.9 weight percent HFC-338pcc, 21.7 weight percent cis-1,2-dichloroethylene and 2.4 weight percent isopropanol was prepared in a suitable container and mixed thoroughly.

The solution was distilled in a five plate Oldershaw distillation column using a 2:1 reflux to take-off ratio. Head and pot temperatures were read directly to 0.1° C. The pressure was at 759.3 mmHg. Distillate compositions were determined by gas chromatography. Results obtained are summarized in Table 6.

TABLE 6

| | TEMPERATURE °C. | | WT. % DISTILLED OR | WEIGHT PERCENTAGES | | |
|---|---|---|---|---|---|---|
| CUTS | POT | HEAD | RECOVERED | HFC-338pcc | CIS | IPA |
| 1 | 42.0 | 44.0 | 12.9 | 81.6 | 18.2 | 0.3 |
| 2 | 42.1 | 44.4 | 24.1 | 81.3 | 18.4 | 0.3 |
| 3 | 42.1 | 44.7 | 42.2 | 81.5 | 18.2 | 0.4 |
| 4 | 42.2 | 45.4 | 52.9 | 81.0 | 18.7 | 0.4 |
| 5 | 42.2 | 46.5 | 64.3 | 80.9 | 18.7 | 0.4 |
| 6 | 42.3 | 52.2 | 77.5 | 80.6 | 19.0 | 0.5 |
| 7 | 45.1 | 76.9 | 81.0 | 79.0 | 20.4 | 0.6 |
| HEEL | — | — | 88.9 | 30.6 | 45.4 | 24.0 |

Analysis of the above data indicates very small differences between head temperatures and distillate compositions as the distillation progressed. A statistical analysis of the data indicates that the true ternary azeotrope of HFC-338pcc, cis-1,2-dichloroethylene and isopropanol has the following characteristics at atmospheric pressure (99 percent confidence limits):

| | |
|---|---|
| HFC-338pcc = | 81.0 +/− 1.2 wt. % |
| cis-1,2-dichloroethylene = | 18.6 +/− 1.0 wt. % |
| isopropanol = | 0.4 +/− 0.2 wt. % |
| Boiling point, °C. = | 42.2 +/− 0.2 |

EXAMPLE 8

A solution containing 75.3 weight percent HFC-338pcc, 21.9 weight percent 1,1-dichloroethane and 2.8 weight percent methanol was prepared in a suitable container and mixed thoroughly.

The solution was distilled in a twenty-five plate Oldershaw distillation column using a 15:1 reflux to take-off ratio. Head and pot temperatures were read directly to 0.1° C. The pressure was at 768.1 mmHg. Distillate compositions were determined by gas chromatography. Results obtained are summarized in Table 7.

TABLE 7

| | TEMPERATURE °C. | | WT. % DISTILLED OR | WEIGHT PERCENTAGES | | |
|---|---|---|---|---|---|---|
| CUTS | POT | HEAD | RECOVERED | HFC-338pcc | 11DCE | MEOH |
| 1 | 42.4 | 40.2 | 11.9 | 80.6 | 16.1 | 3.3 |
| 2 | 42.9 | 40.3 | 22.4 | 80.5 | 16.1 | 3.4 |
| 3 | 43.4 | 40.3 | 31.7 | 80.6 | 16.1 | 3.4 |
| 4 | 44.9 | 40.3 | 41.7 | 80.6 | 16.0 | 3.4 |
| 5 | 46.3 | 40.3 | 51.4 | 80.7 | 16.0 | 3.4 |
| 6 | 99.0 | 41.9 | 59.0 | 80.6 | 16.0 | 3.3 |
| 7 | — | — | 66.3 | 81.6 | 16.4 | 2.1 |
| HEEL | — | — | 86.2 | 73.1 | 26.8 | 0.1 |

Analysis of the above data indicates very small differences between head temperatures and distillate compositions at the distillation progressed. A statistical analysis of the data indicates that the true ternary azeotrope of HFC-338pcc, 1,1-dichloroethane and methanol has the following characteristics at atmospheric pressure (99 percent confidence limits):

| | |
|---|---|
| HFC-338pcc = | 80.6 +/− 0.3 wt. % |
| 1,1-dichloroethane = | 16.0 +/− 0.2 wt. % |
| methanol = | 3.4 +/− 0.1 wt. % |
| Boiling point, °C. = | 40.3 +/− 0.0 |

EXAMPLE 9

A solution containing 78.3 weight percent HFC-338pcc, 18.8 weight percent 1,1-dichloroethane and 2.9 weight percent ethanol was prepared in a suitable container and mixed thoroughly.

The solution was distilled in a five plate Oldershaw distillation column using a 5:1 reflux to take-off ratio. Head and pot temperatures were read directly to 0.1° C. The pressure was at 768.9 mmHg. Distillate compositions were determined by gas chromatography. Results obtained are summarized in Table 8.

TABLE 8

| CUTS | TEMPERATURE °C. POT | HEAD | WT. % DISTILLED OR RECOVERED | WEIGHT PERCENTAGES HFC-338pcc | 11DCE | ETOH |
| --- | --- | --- | --- | --- | --- | --- |
| 1 | 35.8 | 38.0 | 8.6 | 78.4 | 20.3 | 1.3 |
| 2 | 35.8 | 38.4 | 27.6 | 78.1 | 20.5 | 1.4 |
| 3 | 35.8 | 39.0 | 42.7 | 78.2 | 20.4 | 1.4 |
| 4 | 35.8 | 40.1 | 54.8 | 78.0 | 20.6 | 1.4 |
| 5 | 35.8 | 42.7 | 68.5 | 77.7 | 20.9 | 1.5 |
| 6 | 35.8 | 50.6 | 80.8 | 77.0 | 21.5 | 1.5 |
| 7 | 35.9 | 78.0 | 90.3 | 71.2 | 26.3 | 2.5 |
| HEEL | — | — | 94.3 | 38.1 | 39.7 | 22.2 |

Analysis of the above data indicates very small differences between head temperatures and distillate compositions as the distillation progressed. A statistical analysis of the data indicates that the true ternary azeotrope of HFC-338pcc, 1,1-dichloroethane and ethanol has the following characteristics at atmospheric pressure (99 percent confidence limits):

| | |
| --- | --- |
| HFC-338pcc = | 78.0 +/− 0.9 wt. % |
| 1,1-dichloroethane = | 20.6 +/− 0.7 wt. % |
| ethanol = | 1.4 +/− 0.2 wt. % |
| Boiling point, °C. = | 39.6 +/− 6.3 |

EXAMPLE 10

A solution containing 77.8 weight percent HFC-338pcc, 19.4 weight percent 1,1-dichloroethane and 3.0 weight percent isopropanol was prepared in a suitable container and mixed thoroughly.

The solution was distilled in a five plate Oldershaw distillation column using a 5:1 reflux to take-off ratio. Head and pot temperatures were read directly to 0.1° C. The pressure was at 764.0 mmHg. Distillate compositions were determined by gas chromatography. Results obtained are summarized in Table 9.

TABLE 9

| CUTS | TEMPERATURE °C. POT | HEAD | WT. % DISTILLED OR RECOVERED | WEIGHT PERCENTAGES HFC-338pcc | 11DCE | IPA |
| --- | --- | --- | --- | --- | --- | --- |
| 1 | 44.7 | 42.6 | 15.2 | 79.9 | 19.8 | 0.3 |
| 2 | 45.0 | 42.6 | 24.4 | 82.3 | 17.4 | 0.3 |
| 3 | 45.5 | 42.6 | 35.2 | 82.0 | 17.6 | 0.4 |
| 4 | 45.8 | 42.6 | 46.7 | 82.0 | 17.6 | 0.4 |
| 5 | 46.7 | 42.6 | 57.5 | 81.7 | 17.9 | 0.4 |
| 6 | 47.7 | 42.7 | 66.7 | 81.0 | 18.5 | 0.5 |
| 7 | 42.7 | 51.5 | 74.5 | 80.6 | 18.9 | 2.1 |
| HEEL | — | — | 82.3 | 63.5 | 25.1 | 11.4 |

Analysis of the above data indicates very small differences between head temperatures and distillate compositions as the distillation progressed. A statistical analysis of the data indicates that the true ternary azeotrope of HFC-338pcc, 1,1-dichloroethane and isopropanol has the following characteristics at atmospheric pressure (99 percent confidence limits):

| | |
| --- | --- |
| HFC-338pcc = | 82.0 +/− 1.0 wt. % |
| 1,1-dichloroethane = | 17.6 +/− 0.8 wt. % |
| isopropanol = | 0.4 +/− 0.2 wt. % |
| Boiling point, °C. = | 42.6 +/− 0.1 |

EXAMPLE 11

A solution containing 77.4 weight percent HFC-338pcc, 19.6 weight percent HCFC-225cb and 3.0 weight percent methanol was prepared in a suitable container and mixed thoroughly.

The solution was distilled in a five plate Oldershaw distillation column using a 2:1 reflux to take-off ratio. Head and pot temperatures were read directly to 0.1° C. The pressure was at 771.3 mmHg. Distillate compositions were determined by gas chromatography. Results obtained are summarized in Table 10.

TABLE 10

| CUTS | TEMPERATURE °C. POT | HEAD | WT. % DISTILLED OR RECOVERED | WEIGHT PERCENTAGES HFC-338pcc | 225cb | MEOH |
| --- | --- | --- | --- | --- | --- | --- |
| 1 | 42.8 | 41.9 | 12.0 | 82.9 | 13.7 | 3.5 |
| 2 | 42.9 | 42.0 | 22.7 | 82.0 | 14.3 | 3.8 |
| 3 | 43.1 | 42.0 | 33.9 | 82.3 | 14.0 | 3.7 |
| 4 | 43.4 | 42.1 | 46.9 | 80.5 | 15.8 | 3.8 |
| 5 | 44.4 | 42.1 | 58.0 | 79.1 | 17.1 | 3.8 |
| 6 | 47.2 | 43.0 | 71.8 | 77.4 | 19.1 | 3.5 |
| 7 | 54.4 | 45.6 | 83.3 | 75.1 | 23.4 | 1.5 |
| HEEL | — | — | 93.6 | 59.6 | 40.3 | 0.2 |

Analysis of the above data indicates very small differences between head temperatures and distillate compositions as the distillation progressed. A statistical analysis of the data indicates that the true ternary azeotrope of HFC-338pcc, HCFC-225cb and methanol has the following characteristics at atmospheric pressure (99 percent confidence limits):

| | |
|---|---|
| HFC-338pcc = | 81.3 +/− 5.1 wt. % |
| HCFC-225cb = | 15.0 +/− 4.9 wt. % |
| methanol = | 3.7 +/− 0.5 wt. % |
| Boiling point, °C. = | 42.0 +/− 0.3 |

EXAMPLE 12

Several single sided circuit boards were coated with activated rosin flux and soldered by passing the boards over a preheater, to obtain top side board temperatures of approximately 200° F. (93.3° C.), and then through 500° F. (260° C.) molten solder. The soldered boards were defluxed separately, with each of the azeotropic mixtures reported in Examples 3 through 11 above, by suspending a circuit board, first, for three minutes in the boiling sump, which contains the azeotropic mixture, then, for one minute in the rinse sump, which contains the same azeotropic mixture, and finally, for one minute in the solvent vapor above the boiling sump. The boards cleaned in each azeotropic mixture had no visible residue remaining thereon.

ADDITIONAL COMPOUNDS

Other components, such as aliphatic hydrocarbons having a boiling point of 35°–85° C., hydrofluorocarbonalkanes having a boiling point of 35°–85° C., hydrofluoropropanes having a boiling point of between 35°–85° C., hydrocarbon esters having a boiling point between 30°–80° C., hydrochlorofluorocarbons having a boiling point between 25°–85° C., hydrofluorocarbons having a boiling point of 25°–85° C., hydrochlorocarbons having a boiling point between 35°–85° C., chlorocarbons and perfluorinated compounds, can be added to the azeotropic or azeotrope-like compositions described above without substantially changing the properties thereof, including the constant boiling behavior, of the compositions. Examples of such components, which typically do not exceed about 10 weight percent of the total composition, include the following.

| COMPOUND | FORMULA | boiling point, °C. |
|---|---|---|
| HCFC-123 | $CHCl_2CF_3$ | 27 |
| HCFC-141b | $CFCl_2CH_3$ | 32 |
| HCFC-225aa | $CHF_2CCl_2CF_3$ | 53 |
| HCFC-225ca | $CHCl_2CF_2CF_3$ | 52 |
| HCFC-225cb | $CHClFCF_2CF_2Cl$ | 56 |
| HCFC-225da | $CClF_2CHClCF_3$ | 50 |
| HFC-43-10mf | $CF_3CH_2CF_2CF_2CF_3$ | 52 |
| HFC-43-10mcf | $CF_3CF_2CH_2CF_2CF_3$ | 52 |
| FC-C-51-12 | cyclo-$C_4F_6(CF_3)_2$ | 45 |
| | $CH_3OCF_2CHFCF_3$ | 52 |
| HFC-C-456myc | cyclo-$CH_2CH_2CF_2CF(CF_3)$ | |
| HFC-C-354 | cyclo-$CF_2CF_2CH_2CH_2$ | 50 |
| | $C_4F_9CH=CH_2$ | 58 |
| MEK | $CH_3C(O)C_2H_5$ | 80 |
| THF | cyclo-$OC_4H_8$ | 66 |
| methyl formate | $HC(O)OCH_3$ | 32 |
| ethyl formate | $HC(O)OC_2H_5$ | 54 |
| methyl acetate | $CH_3C(O)OCH_3$ | 56 |
| ethyl acetate | $CH_3C(O)OC_2H_5$ | 77 |
| cyclohexane | | 81 |
| hexane | | 69 |
| cyclopentane | | 49 |
| acetone | | 56 |
| 1,2-dichloroethane | | 84 |
| acetonitrile | | 82 |

| COMPOUND | FORMULA | boiling point, °C. |
|---|---|---|
| methylene chloride | | 40 |

Additives such as lubricants, corrosion inhibitors, stabilizers, surfactants, dyes and other appropriate materials may be added to the novel compositions of the invention for a variety of purposes provided they do not have an adverse influence on the composition, for their intended applications. Examples of stabilizers include nitromethane and nitroethane.

We claim:

1. An azeotropic or azeotrope like composition consisting essentially of 56.8 to 69.8 weight percent 1,1,2,2,3,3,4,4-octafluorobutane, 27.9 to 39.9 weight percent trans-1,2-dichloroethylene, and 1.8 to 3.8 weight percent methanol, wherein when the pressure has been adjusted to substantially atmospheric pressure, the boiling point of the composition is about 34.7° C.; 63.2 to 69.2 weight percent 1,1,2,2,3,3,4,4-octafluorobutane, 30.0 to 36.0 weight percent trans-1,2-dichloroethylene, and 0.2 to 1.4 weight percent ethanol, wherein when the pressure has been adjusted to substantially atmospheric pressure, the boiling point of the composition is about 36.1° C.; 60.0 to 68.0 weight percent 1,1,2,2,3,3,4,4-octafluorobutane, 31.7 to 39.7 weight percent trans-1,2-dichloro-ethylene, and 0.1 to 0.5 weight percent isopropanol, wherein when the pressure has been adjusted to substantially atmospheric pressure, the boiling point of the composition is about 36.0° C.; 78.2 to 84.2 weight percent 1,1,2,2,3,3,4,4-octafluorobutane, 12.3 to 18.3 weight percent cis-1,2-dichloroethylene, and 2.5 to 4.5 weight percent methanol, wherein when the pressure has been adjusted to substantially atmospheric pressure, the boiling point of the composition is about 40.2° C.; 72.4 to 85.4 weight percent 1,1,2,2,3,3,4,4,-octafluorobutane 12.7 to 26.7 weight percent cis-1,2-dichloroethylene, and 0.4 to 2.4 weight percent ethanol, wherein when the pressure has been adjusted to to substantially atmospheric pressure, the boiling point of the composition is about 42.5° C.; 75.0 to 86.0 weight percent 1,1,2,2,3,3,4,4-octafluorobutane, 12.5 to 23.5 weight percent cis-1,2-dichloroethylene, and 0.1 to 1.0 weight percent isopropanol, wherein when the pressure has been adjusted to substantially atmospheric pressure, the boiling point of the composition is about 42.2° C.; 76.6 to 84.6 weight percent 1,1,2,2,3,3,4,4-octafluorobutane, 14.0 to 18.0 weight percent 1,1-dichloroethane, and 1.4 to 5.4 weight percent methanol, wherein when the pressure has been adjusted to substantially atmospheric pressure, the boiling point of the composition is about 40.3° C.; 73.5 to 82.5 weight percent 1,1,2,2,3,3,4,4-octafluorobutane, 17.1 to 24.1 weight percent 1,1-dichloroethane, and 0.4 to 2.4 weight percent ethanol, wherein when the pressure has been adjusted to substantially atmospheric pressure, the boiling point of the composition is about 39.6° C.; and 77.0 to 87.0 weight percent 1,1,2,2,3,3,4,4-octafluorobutane, 12.6 to 22.6 weight percent 1,1-dichlorethane, and 0.1 to 1.0 weight percent isopropanol, wherein when the pressure has been adjusted to substantially atmospheric pressure, the boiling point of the composition is about 42.6° C.

2. The composition of claim 1, consisting essentially of 62.0 to 64.6 weight percent 1,1,2,2,3,3,4,4-octaflurobutane, 32.7 to 35.1 weight percent trans-1,2- dichloroethylene, and 2.6 to 3.0 weight percent methanol; 65.9 to 66.5 weight percent 1,1,2,2,3,3,4,4-octafluorobutane, 32.8 to 33.2 weight percent trans-1,2-dichloroethylene, and 0.6 to 1.0 weight percent ethanol; 63.9 to 64.1 weight percent 1,1,2,2,3,3,4,4-octafluorobutane, 35.5 to 35.9 weight percent trans-1,2-dichloroethylene, and 0.2 to 0.4 weight percent isopropanol; 80.9 to 81.5 weight percent 1,1,2,2,3,3,4,4-octafluorobutane, 15.0 to 15.6 weight percent cis-1,2-dichloroethylene, and 3.4 to 3.6 weight percent methanol; 77.6 to 80.2 weight percent 1,1,2,2,3,3,4,4-octafluorobutane, 18.3 to 21.1 weight percent cis-1,2-dichloroethylene, and 1.2 to 1.6 weight percent ethanol; 79.0 to 83.0 weight percent 1,1,2,2,3,3,4,4-octafluorobutane, 17.5 to 19.5 weight percent cis-1,2-dichloroethylene, and 0.2 to 0.4 weight percent isopropanol; 80.2 to 81.0 weight percent 1,1,2,2,3,3,4,4-octafluorobutane, about 15.8 to 16.2 weight percent 1,1-dichloroethane, and about 3.2 to 3.6 weight percent methanol; 77.1 to 78.9 weight percent 1,1,2,2,3,3,4,4-octafluorobutane, 19.9 to 21.3 weight percent 1,1-dichloroethane, and 1.2 to 1.6 weight percent ethanol; and 81.9 to 82.1 weight percent 1,1,2,2,3,3,4,4-octafluorobutane, 17.5 to 17.7 weight percent 1,1-dichloroethane, and 0.2 to 0.6 weight percent isopropanol.

3. The composition of claim 1, consisting essentially of about 63.3 weight percent 1,1,2,2,3,3,4,4-octafluorobutane, about 33.9 weight percent trans-1,2-dichloroethylene, and about 2.8 weight percent methanol; about 66.2 weight percent 1,1,2,2,3,3,4,4-octafluorobutane, about 33.1 weight percent trans-1,2-dichloroethylene, and about 0.7 weight percent ethanol; about 64.0 weight percent 1,1,2,2,3,3,4,4-octafluorobutane, about 35.7 weight percent trans-1,2-dichloroethylene, and about 0.3 weight percent isopropanol; of about 81.2 weight percent 1,1,2,2,3,3,4,4-octafluorobutane, about 15.3 weight percent cis-1,2-dichloroethylene, and about 3.5 weight percent methanol; about 78.9 weight percent 1,1,2,2,3,3,4,4-octafluorobutane, about 19.7 weight percent cis-1,2-dichloroethylene, and about 1.4 weight percent ethanol; about 81.0 weight percent 1,1,2,2,3,3,4,4-octafluorobutane, about 18.6 weight percent cis-1,2-dichloroethylene, and about 0.4 weight percent isopropanol; about 80.6 weight percent 1,1,2,2,3,3,4,4-octafluorobutane, about 16.0 weight percent 1,1-dichloroethane, and about 3.4 weight percent methanol; about 78.1 weight percent 1,1,2,2,3,3,4,4-octafluorobutane, about 20.6 weight percent 1,1-dichloroethane, and about 1.4 weight percent ethanol; and about 82.0 weight percent 1,1,2,2,3,3,4,4-octafluorobutane, about 17.6 weight percent 1,1-dichloroethane, and about 0.4 weight percent isopropanol.

4. A process for cleaning a solid surface comprising treating said surface with a composition of any of claims 1 through 3.

5. A process for producing refrigeration, comprising condensing a composition of any of claims 1 through 3, and thereafter evaporating said composition in the vicinity of a body to be cooled.

* * * * *